(No Model.)
E. A. ARMSTRONG & W. N. WILLARD.
FOLDING CRATE.
No. 600,762. Patented Mar. 15, 1898.
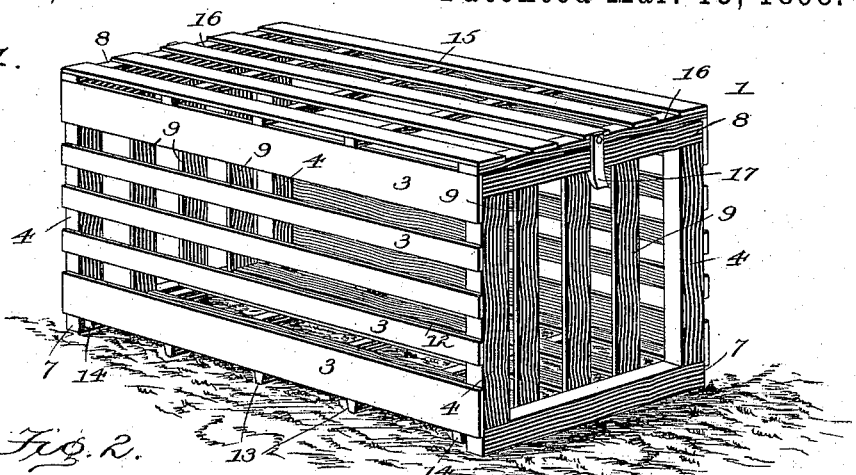
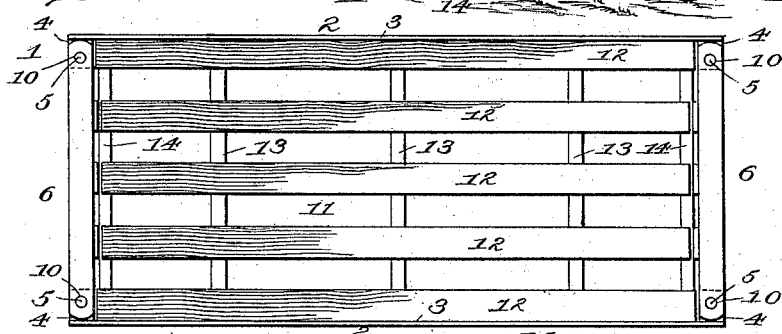
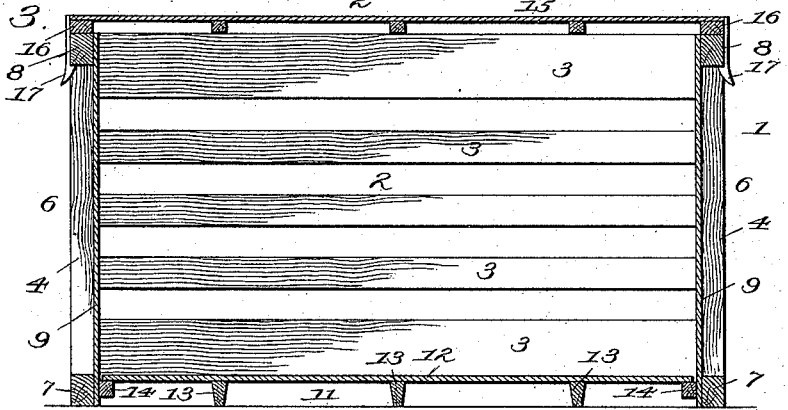
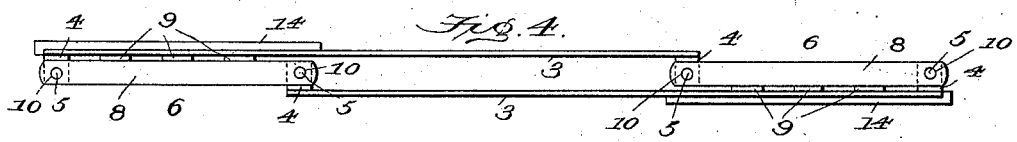
WITNESSES:
Edwin L. Bradford
R. H. McPherson Jr.
INVENTORS
E. A. Armstrong
W. N. Willard
BY
R. S. & A. B. Racey.
ATTORNEYS.

UNITED STATES PATENT OFFICE.

EZRA A. ARMSTRONG AND WILLIAM N. WILLARD, OF SAMARIA, MICHIGAN, ASSIGNORS OF ONE-THIRD TO ELLSWORTH D. STEWART, OF SAME PLACE.

FOLDING CRATE.

SPECIFICATION forming part of Letters Patent No. 600,762, dated March 15, 1898.

Application filed June 30, 1897. Serial No. 642,938. (No model.)

*To all whom it may concern:*

Be it known that we, EZRA A. ARMSTRONG and WILLIAM N. WILLARD, citizens of the United States, residing at Samaria, in the county of Monroe and State of Michigan, have invented certain new and useful Improvements in Folding Crates; and we do hereby declare the following to be a full, clear, and exact description of the invention, such as will enable others skilled in the art to which it appertains to make and use the same.

Our invention relates to improvements in crates for shipping berries and vegetables; and its object is to provide a simple and cheap construction of crate of the foldable or knockdown type which after use may be collapsed in compact shape for storage or shipment.

With this and other objects in view the invention consists in the novel constructions and combinations of parts hereinafter more fully described, and particularly pointed out in the appended claims.

In the drawings herewith, Figure 1 is a perspective view of the crate; Fig. 2, a plan view; Fig. 3, a longitudinal section, and Fig. 4 a plan view showing the crate folded.

Like numerals of reference designate corresponding parts throughout the several views of the drawings.

The crate 1 is constructed with the side sections 2, each consisting of a series of horizontal longitudinally-extending slats 3, rigidly secured at each end to vertical corner posts or bars 4, said posts being provided at top and bottom with circular pivot-pins or dowels 5. The end sections 6 are constructed with transverse sill and top bars 7 8, connected by spaced vertical slats 9, said slats being rigidly secured thereto. The slats of the several sections of the crate may, if desired, abut or fit closely together, but are preferably spaced apart in order to permit of free ventilation. The said sill and top bars 7 8 of the end sections are formed with vertical sockets or openings 10 for reception of the pin or dowel 9 of the side sections, and in practice the sill-blocks 7 will preferably extend down below the bottom and side sections to serve as supports and to prevent the bottom of the crate from coming into direct contact with the ground or floor. By this construction it will be seen that the side and end sections of the crate are adapted to fold inwardly upon each other in the manner shown in Fig. 4, the dowels or pins 9 constituting the pivots on which said sections turn.

When the crate is folded, the end sections 6 have position between the side sections and extend parallel therewith and lie in the same plane.

The bottom section 11 consists of a series of spaced slats 12, connected by cross-bars 13, which latter rest upon the floor or ground when the grate is in use and serve, in connection with the sill-bars 7, to raise the bottom of the crate above the floor or ground surface to afford room for ventilation from below. This bottom section when in use rests upon transverse cleats 14, rigidly secured to the inner sides of the sills, and when thus positioned rigidly maintains the side and end sections of the crate in open position and in proper relation to each other.

The top or cover 15 is constructed substantially like the bottom section except that it is provided at the ends with cross-pieces 16, having spring-metal hooks 17, adapted to engage the top bars 8 of the end sections to hold the cover in position on the crate. Any other suitable fastening means may be employed, however, for this purpose.

After the contents of the crate have been removed the crate may be folded by removing the cover and bottom section and turning the side and end sections parallel in the manner shown in Fig. 4. When the body of the crate is thus folded, the cover and bottom section may be laid thereon and tied or otherwise suitably secured thereto. By this construction the crate may be folded in extremely small compass, so as to occupy but little space in storage or during shipment.

Our invention provides a crate which possesses the desirable advantages of simplicity and cheapness in construction combined with rigidity, which insures the prevention of accidental collapsing of the crate and injury to the contents thereof.

Having thus fully described our invention, what we claim as new and useful, and desire to secure by Letters Patent of the United States, is—

1. In folding crates, the combination of the end sections provided with top and bottom bars having sockets, the side sections having vertical end bars or posts provided with pins or dowels fitting in said sockets, whereby the body of the crate is adapted to fold with the end sections extending parallel with and interposed between said side sections and removable bottom and top or cover sections, substantially as described.

2. In folding crates, the combination of the end sections provided with top and bottom bars having sockets, the side sections having vertical end bars or posts provided with pins or dowels fitting in said sockets and transverse cleats on the inner sides of said bottom bars, whereby the body of the crate is adapted to fold with the end sections extending parallel with and interposed between said side sections, a removable bottom section adapted to rest on said transverse cleats, and a removable cover provided with fastening means to engage the top cross-bars of the end sections, substantially as described.

In testimony whereof we affix our signatures in presence of two witnesses.

EZRA A. ARMSTRONG.
WILLIAM N. WILLARD.

Witnesses:
WILLIAM DUNBAR,
DANIEL A. JENKINS.